May 16, 1933.  E. H. WAUGH  1,909,643
FEEDER TABLE
Filed March 10, 1930  4 Sheets-Sheet 1
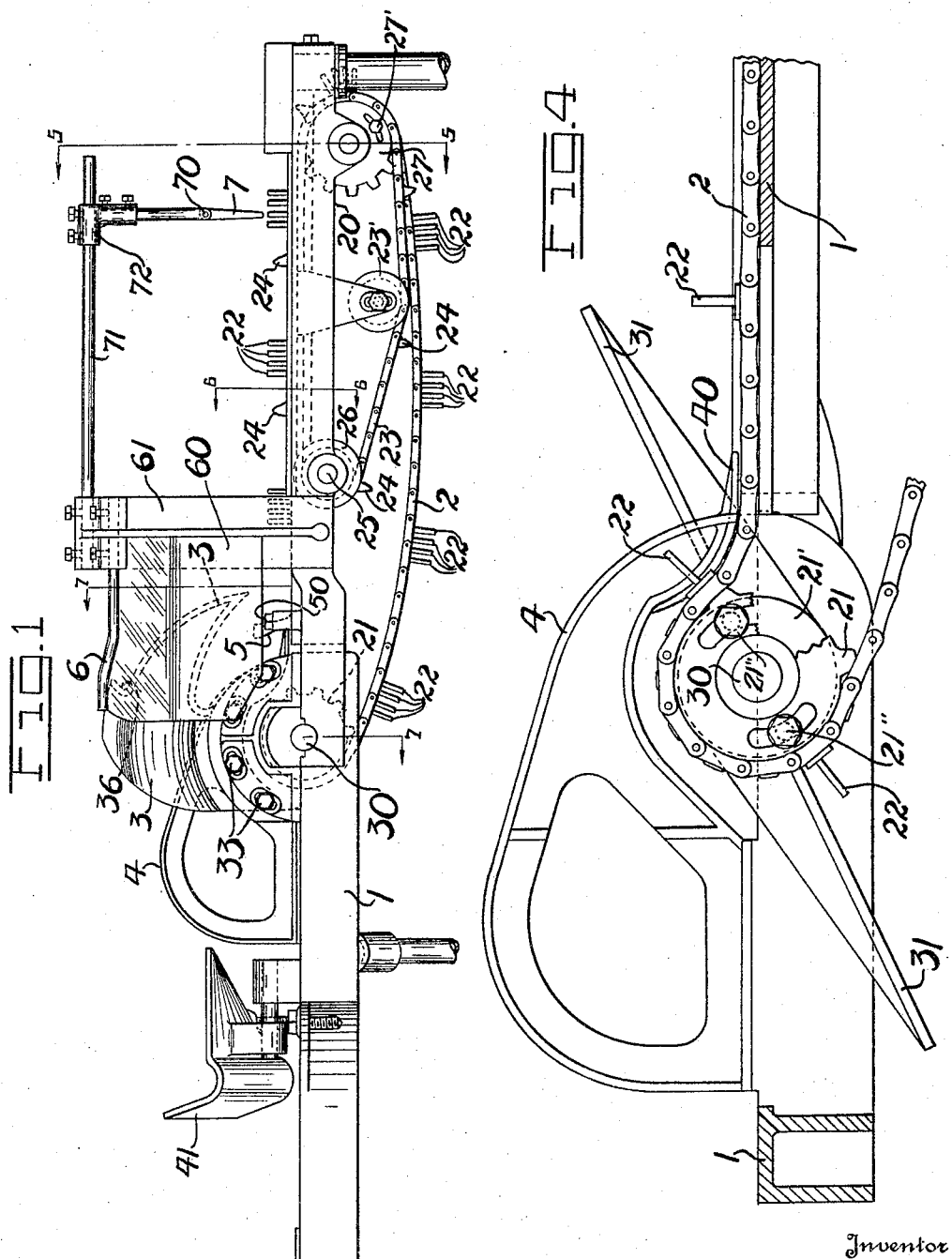
Inventor
Edward H. Waugh
By Charles L. Reynolds
Attorney

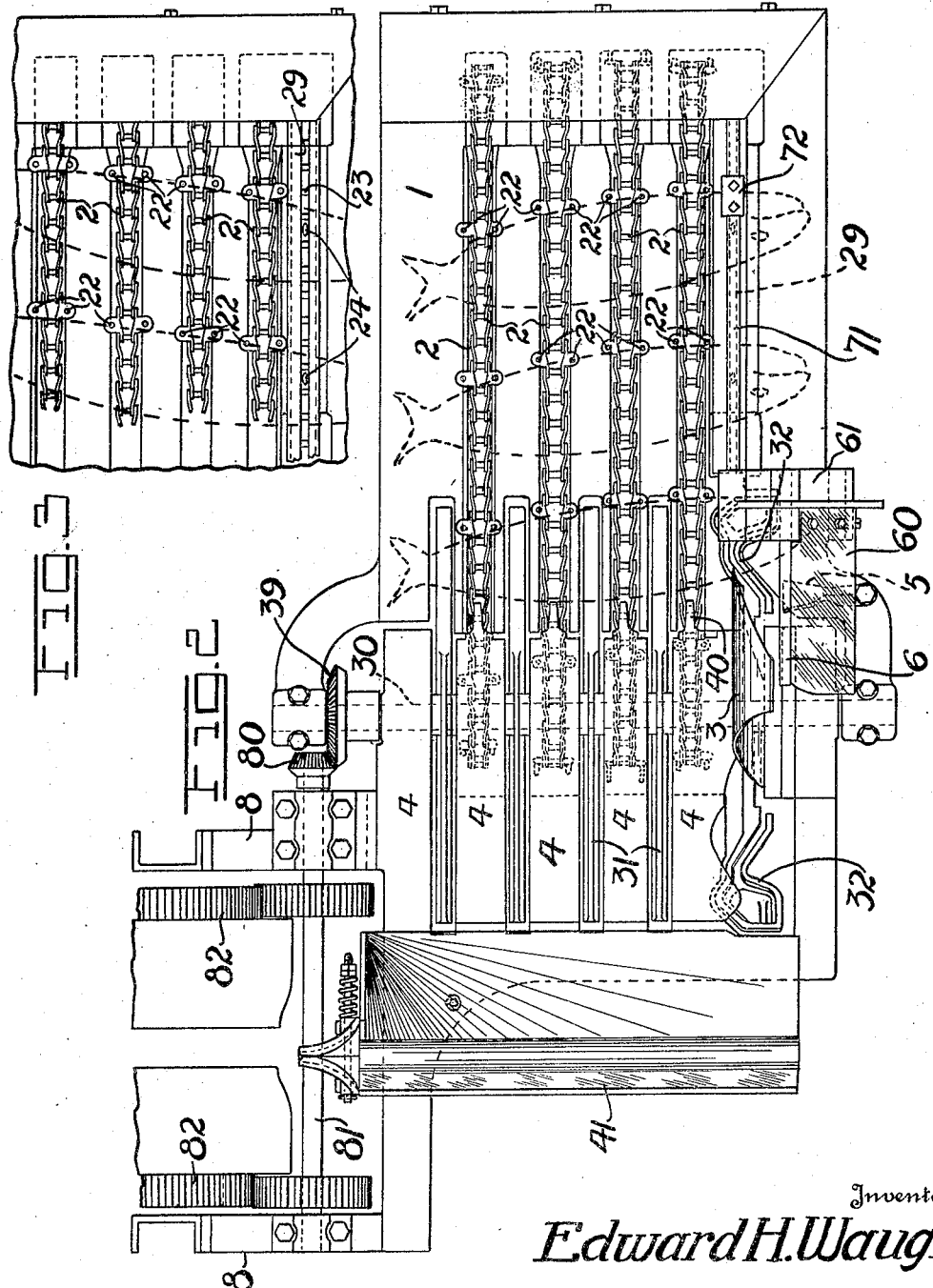

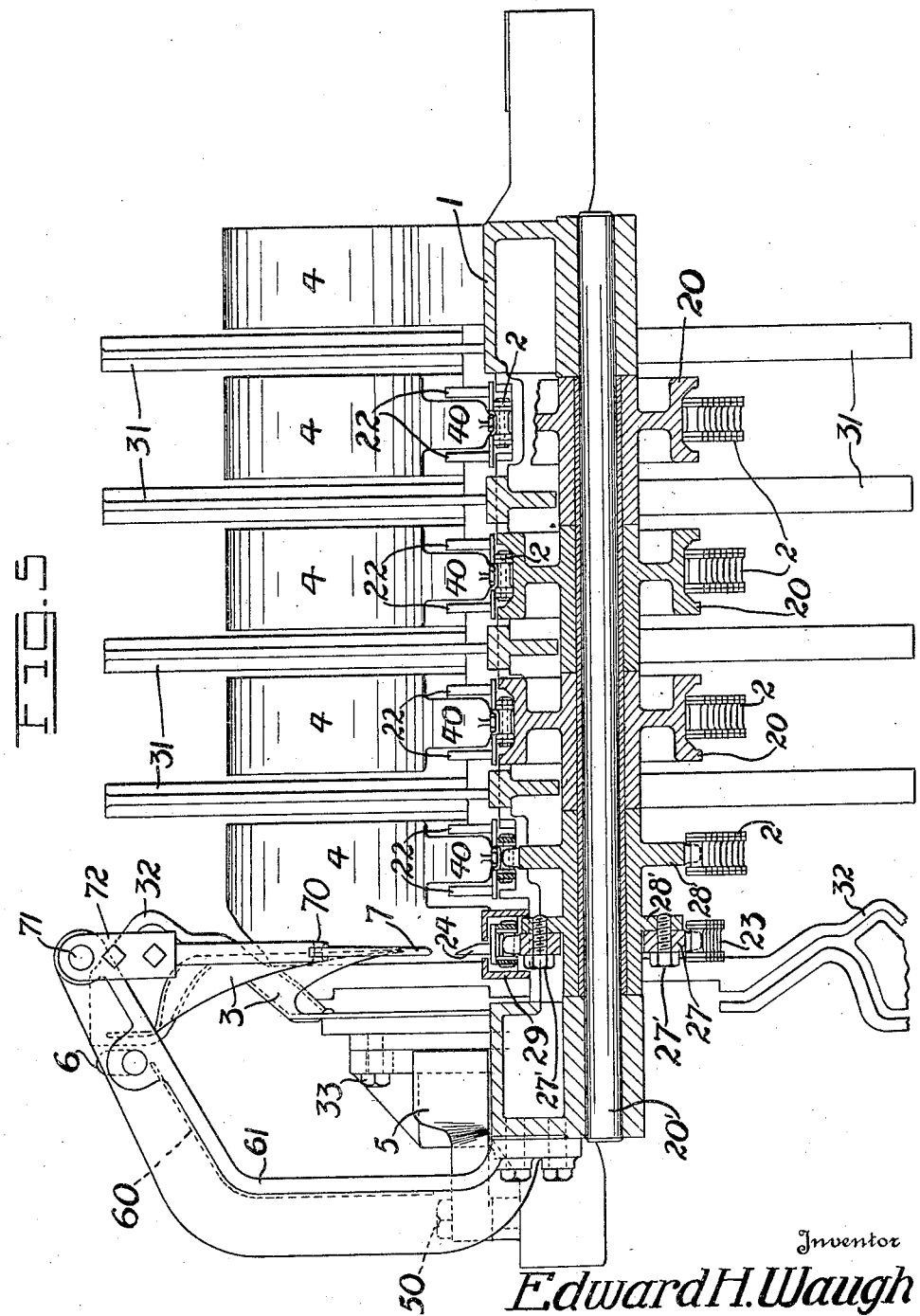

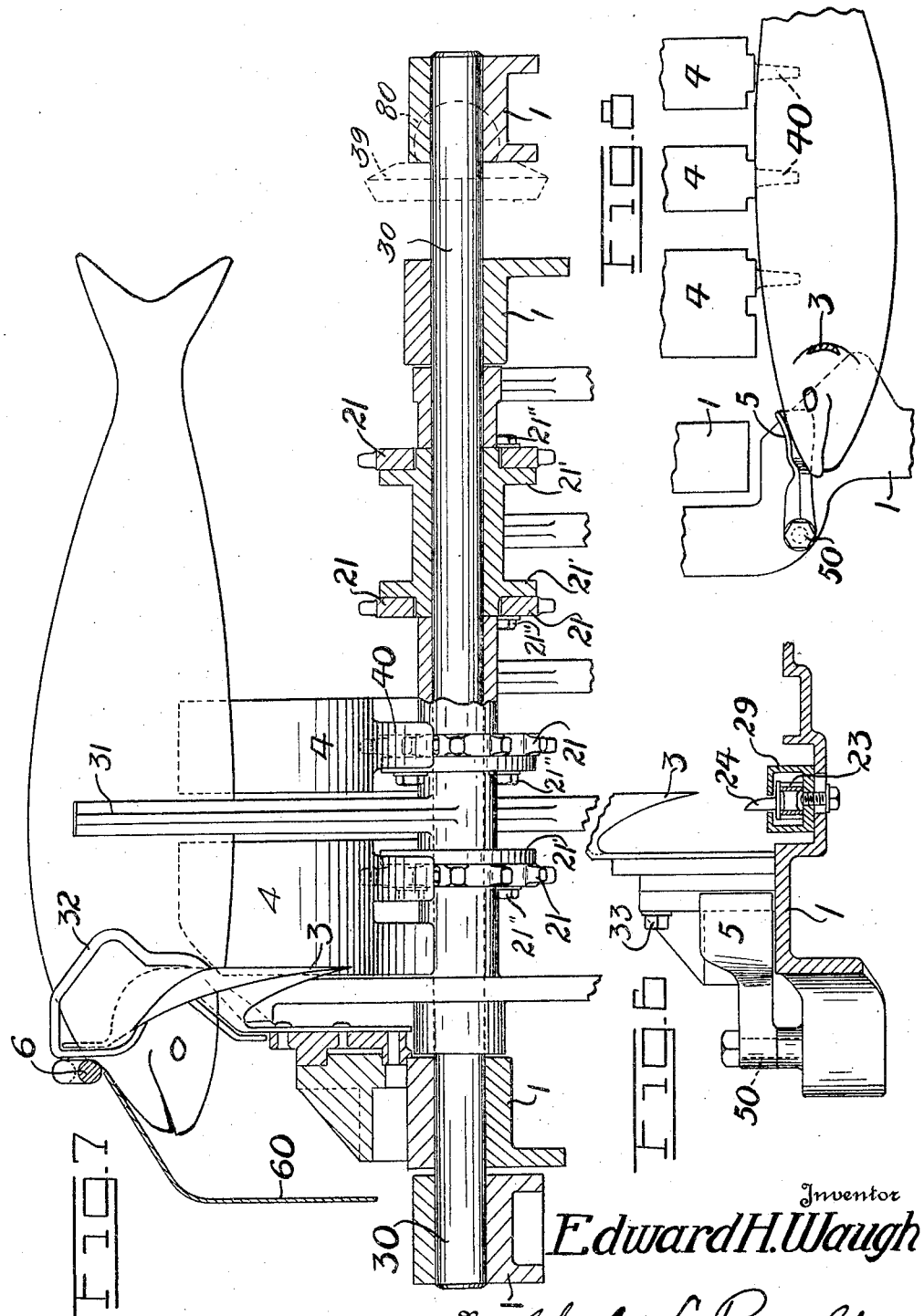

Patented May 16, 1933

1,909,643

UNITED STATES PATENT OFFICE

EDWARD H. WAUGH, OF SEATTLE, WASHINGTON, ASSIGNOR TO SMITH CANNERY MACHINES COMPANY, OF SEATTLE, WASHINGTON, A CORPORATION OF WASHINGTON

FEEDER TABLE

Application filed March 10, 1930. Serial No. 434,479.

My invention relates generally to fish dressing machines and more particularly to a feed table for use in association with fish dressing machines, and in association with a fish beheading device.

It is one of the objects of my invention to provide a table for feeding fish to a beheading device and to a fish dressing machine whereby the fish may be easily and properly positioned with respect to the beheading device, and maintained in that position during its advance to the beheading device, and prior to and during the beheading action, enabling the operator to operate the fish dressing machine at its maximum capacity, and further, to provide a device of this character wherein the danger of injury to the operator, which might be expected to increase rapidly with increase in speed, is reduced to a minimum.

A further object is the provision of a feed table of the general character indicated above wherein is provided means for automatically adjusting the position of the fish as it is carried along the feed table, thus to present it at different angles to the beheading knife, so as to produce variation in the angle and shape of the cut.

A further object is the provision in a feed table for fish dressing machines, especially in such as include a beheading device, of a means for adjusting the position of the fish and particularly the gill sections thereof, lengthwise of the fish relative to the beheading device, that is, to locate the beheading cut at or behind the gills, as the operator may desire.

A further object is to provide a simplified feed table and feed means for the fish, and a simplified drive therefor, and in association with this, elevating means to raise the fish from the feed table and to carry it through the beheading device.

A further object is to provide a means for making certain that the head is severed and to complete its severance.

Other objects, and more especially those which relate to the mechanical structure involved, may be ascertained from a study of this specification and the claims which terminate the same, and of the drawings, wherein my invention is shown in a form which is at present preferred by me.

My invention comprises the novel parts and the novel combination and arrangement thereof, as shown in the accompanying drawings, described in this specification and particularly defined by the claims terminating the same.

Figure 1 is a side elevation of my feed table, taken from the side where the operator stands.

Figure 2 is a plan view of the same, and Figure 3 is a plan view of a portion of the feed table, showing parts in different adjusted positions.

Figure 4 is an end elevation of the delivery end of the feed table, parts of the frame being omitted.

Figure 5 is a section substantially on the line 5—5 of Figure 1.

Figure 6 is a detail section on the line 6—6 of Figure 1, showing parts in a different adjustment from that shown in Figure 5.

Figure 7 is a section on substantially the line 7—7 of Figure 1.

Figure 8 is a plan view of a detail of the positioning means at the delivery end of the feed table.

In general my feed table comprises a support for the fish, such as the table 1, or it may comprise the feed chains 2, which chains extend over idler sprockets or pulleys 20 on a shaft 20' and over live sprocket 21 on a shaft 30 driven from a suitable source of power, for instance, through the bevel gears 80 and 39, the former of which is secured upon an extension of the shaft 81 which drives the bull ring 82 of the fish dressing machine 8. As a means of advancing the fish, I provide lugs upstanding from the chains 2, shown in the form of pins 22. Each of the chains 2 is provided with a series of these lugs spaced by like distances on each of the chains. The table 1 is slotted to permit the projection of the lugs 22 and the chains 2 lie in these slots. The table is of such length that the operator may draw the fish down into position to be engaged by the lugs 22 without danger or the fear of injury to his hands from the knife 3, which is fixed in position at the shaft 30 at the delivery end of the feed table.

It is essential that the fish be properly positioned with respect to the knife 3, and that they be so positioned transversely of the feed table that the knife will always engage the fish, either in the gill or behind the gill, as the operator may desire, and it is also essential that they be disposed at such an angle as to sever the head along a curved line which may take out the larger part either high on the back or low towards the throat, as the operator may desire, and it is my object to design the machine so that these objects may be accomplished, though the fish may vary somewhat in size as they run through the machine.

In order to position the fish transversely of the feed table, and with respect to the spacing of the knife transversely thereof (that is, lengthwise of the fish), I provide a chain 23, which carries a series of upstanding pins 24, spaced from each other to correspond to the spacing between the lugs 22, these pins being adapted to engage in the fish's gills. Preferably, the chain 23, being substantially in line with the knife 3, does not extend as far towards the knife as the chains 2, which, of course, pass over sprockets on the same shaft as the knife 3. It is therefore necessary to provide a shaft 25 on which is supported an idler pulley 26, over which the pin chain 23 passes, and this chain is driven from a sprocket wheel 27 upon the shaft 20, which in turn is mounted upon the same sleeve as the sprocket wheel 28, the latter being driven by its chain 2 (see Figure 5). The pin chain 23 is permitted movement transversely of the feed table with respect to its sprocket 27, and the position of the pins 24 is controlled by a slotted guide member 29, which is adjustable transversely of the feed table, thereby to vary the position of the pins and their path of advance relative to the point of the knife 3 (compare Figures 5 and 6). Positioning of the pins 24 insofar as concerns their alignment with the lugs 22 may be varied by forming the sprocket wheel 27 in two parts, the inner section 28' being fixed to the drive sprocket wheel 28, and the outer section 27 being adjustable angularly relative thereto by means of a slot and bolt connection 27'. I prefer that a weighted tightener 23' be employed in connection with the pin chain 23, since it is this which insures the correct positioning of the gills of the fish, which is most important.

In order to adjust the angle of the fish transversely of the feed table, from that shown in Figure 2, for instance, to that shown in Figure 3, the drive sprocket wheels 21 are not directly mounted upon the shaft 30, but rather are made in two parts, one part of which 21' is secured upon the shaft 30, and the other part of which, carrying the teeth is loose, but adjustably secured in position with respect to part 21' by means of the pin and slot arrangement shown at 21'' (see Figure 4). By releasing the adjustments of the several two-part sprockets, the positions of the lugs 22, with relation to the lugs of adjoining chains, can be readily adjusted, especially since the chains do not pass over sprocket wheels, but rather over pulleys on the shaft 20'.

At the delivery end of the feed chains, and somewhat in advance of the position of the shaft 30, I provide a series of inclined ramps or skids 4, which are separated to permit the rotation of elevating arms 31, which are secured upon the same shaft 30 which carries the sprocket wheels 21. This greatly simplifies the drive arrangements, and positively insures proper transfer of the fish from the chains 2 to the arms 31. These skids 4 extend to about the level of the table 1, and since it is desirable to have the shaft 30 journaled at about this level, and it is not desirable to permit the chains 2 to extend above the level of the table, these skids terminate at the table level in shoes 40, which overlie the chain 2, and hold it down, yet permitting it to rise to pass over the sprocket 21. The skids 4 extend over the sprocket wheels and to a high point located a considerable distance beyond, where the fish, elevated by the arms 31, is permitted to drop into a trough 41 where it is sent by another operator into the fish dressing machine 8 (see Figure 2). In addition to the elevating arms 31 there is an arm 32 which is so formed as to cooperate with the knife 3, and in particular the curvature thereof, so that the throat and neck of the fish are supported by the peculiarly shaped arm 32. Parts are so timed that the elevating arms 31 and 32 will pick up a fish from the table 1 just as it reaches the foot of the ramp 4, and before another fish has been advanced to the foot of the ramp, and by the time the next fish is at the foot of the ramp a following set of elevating arms is in position to remove the fish.

The elevation of the fish by the arms 31 and 32 brings it almost immediately into engagement with a beheading knife 3 which is pointed downwardly, and which is so shaped that it will penetrate the fish at or behind the gills, as the operator may elect, and behead the fish. This knife may be fixed in position, and the fish be moved therepast, as is herein illustrated, or the knife might be rotary, and the fish stationary during the beheading action. The knife might, of course, sever the tail, or in any manner cut through the fish from one side to the other.

It is desirable to provide means to engage the nose of the fish to exactly position it just prior to and during the time that it is raised into engagement with the knife 3, and to this end, I have provided a stop 5, which is mounted upon a vertical clamping bolt 50 in such a manner that it may be swung lengthwise of the feed table. It is so curved and positioned by the operator that it will just engage the nose of an average fish as the latter reaches the foot of the ramps 4, and will hold the nose from advancing farther; the nose will remain in engagement with the stop 5, as the fish is lifted, and until the point of the knife 3 has entered the fish sufficiently to guide it through the remainder of the beheading action.

It will be noted that the knife 3 is so mounted that its point can be swung nearer the table or away therefrom, this adjustment being obtained by means of the clamping bolt and slot support illustrated at 33 (see Figure 1). It will be noted also that the ramps 4 are so proportioned relative to the length of the arms 31 and their path of rotation that the fish is gradually elevated by the arms and moved outwardly along them, until it reaches the highest point of the ramp 4, at which time the arms 31 substantially disappear beneath the surface of the ramp 4 and the fish is left free to slide over to the opposite side of the ramp where it drops into the trough 41.

The beheading action, as will be evident, occurs during the time that the fish is being lifted by the arms 31 and 32, and over the ramp 4. The knife 3 may assume various shapes, in accordance with the type of cut that the operator desires, and the arms 32 are so arranged as to accommodate different shapes of knives. It often happens, whatever the shape of the knife, that a fish which is not exactly positioned, or which may be somewhat larger than the ordinary run, has not its head completely severed, and the head is left dangling by tendons at the throat, and this, of course, would interfere with the subsequent handling and dressing of the fish, and in consequence, the head must be completely severed. Heretofore, this has been done by hand in such instances, but I have provided a means which insures the complete severance of the head. As shown, this takes the form of a bar 6, which is supported parallel to the knife 3, and adjacent the portion 36 which is intended to secure severance of the throat. The bar 6 is so positioned that as the fish is raised past the portion 36 of the knife the head will be engaged by the bar 6 and held from passing. In consequence, as the body of the fish is carried by the arms 31 and 32, and the head is detained by the bar 6, the head will be pulled or cut away from the body, even though it would not otherwise be completely and cleanly severed by the portion 36 alone, and as a result it will not be necessary to complete severance of the head by hand. To further assist the bar 6 and to guard the operators against any possibility of their hands being caught in the knife 3, a guard 60 is provided at this point depending from the bar 6. Both the shield 60 and the bar 6 are supported upon a strong upright 61 from the bed-frame 1, which is so located that the operator will strike it before his hand can reach a position where it might be caught by the knife.

As a matter of convenience, I may provide a pending gauge finger 7, which is hinged at 70 from a rod 71. This rod 71 is positioned in line with the point of the knife 3, and the finger 7, being hinged, yet lying close to the feed table, enables the operator to gauge the position of the gill for the cut. The finger is adjustable laterally to some degree and also longitudinally of the rod 70, by means of the adjustable fitting 72 (see Figure 1).

While it is believed that the operation of the machine will be understood, it may be pointed out that the fish is fed onto the feed table by any suitable means, usually from a chute, and it is then placed by the operator in position to be engaged by one of the positioning pins 24, the position being also gauged by the depending finger 7. As the lugs 22 advance, the fish is engaged by these lugs, and moved to the proper angular position, and is advanced toward the ramp 4, back forward and extending transversely of the feed table. The lugs 22 have previously been placed in such position relative to each other as to carry the fish at the angular position which the operator deems most desirable, the adjustment having already been accomplished, as has already been pointed out, by adjustment of the sprocket halves 21 and 21′ relative to each other. Transverse adjustment of the chain 23 has also been accomplished, to bring the cut in or behind the gills, as may be desired. As the fish reaches the stop 5, parts are so timed that the elevating arms 31 and 32 will engage it from below and will lift it from engagement with the lugs 22 into engagement with the point of the knife 3, and as the elevating arms carry the fish upward, its back lies upon the ramp 4, and being the most solid part of the fish, it is held in fairly well fixed position, that is, angularly transversely of the feed table, and thus it is carried through the knife to sever the head, the severance being assured by the bar 6, if necessary. It is then carried on over the ramp and permitted to slide from the same into the trough 41 where a second operator pushes it down the trough and into position to be engaged by the means provided on the fish dressing machine 8.

More rapid and uniform feeding of fish is attained by the use of this feed table, not only because of the mechanical improvements and adjustments, but because of the psychological effect of a long feed table with a guard so located that the operator can scarcely, without intent, place his hands in line with the knife. The operator is thus freed from thought of personal danger, and can better give his entire attention to the positioning and feeding of the fish.

What I claim as my invention is:

1. A feed table for fish dressing machines comprising in combination, a table having a plurality of longitudinal slots, lugs projecting through said slots, a common drive means for said lugs, whereby they may engage a fish lying upon the table and advance it bodily sidewise, and means forming a part of said drive means for adjusting the relative positions of the lugs transversely of the table.

2. A feed table for fish dressing machines comprising in combination, a plurality of upstanding lugs adapted to engage a fish at points spaced therealong, means to move said lugs simultaneously in parallel paths to advance the fish bodily sidewise, and means for adjusting the relative positions of the lugs transversely of the direction of advance, a beheading knife above the path of travel of the fish, and fixed in definite relationship to its direction of advance, means for elevating the fish from engagement with said lugs into engagement with the knife, without disturbance of the fish's angular position relative to the knife, and an adjustable stop positioned to engage and position the head of the fish immediately prior to and at the inception of the severing action.

3. A feed table for fish dressing machines comprising in combination, a plurality of upstanding lugs adapted to engage a fish at points spaced therealong, means to move said lugs simultaneously in parallel paths to advance the fish bodily sidewise, and means for adjusting the relative positions of the lugs transversely of the direction of advance, a beheading knife above the path of travel of the fish, and fixed in definite relationship to its direction of advance, means for elevating the fish from engagement with said lugs into engagement with the knife, without disturbance of the fish's angular position relative to the knife, and an adjustable stop positioned to engage the head of the fish and to maintain the same in position relative to the knife immediately prior to and during entrance of the knife.

4. In a feed table for fish dressing machines, a fixed beheading knife, means for moving a fish into engagement therewith and therepast, a stop positioned to limit advance of the fish's head into position for engagement by the knife, and maintaining the fish's head, during the inception of the beheading movement, in a selected angular position relative to the knife, and means to adjust said stop to maintain any selected angular position of the fish relative to the knife.

5. In a feed table for fish dressing machines, in combination, a fixed beheading knife, means for moving a fish into engagement therewith and therepast, and means positioned close to the knife and engageable by the head at the completion of the beheading action to prevent further movement thereof, and to insure its severance.

6. The combination of claim 5, the latter means comprising an intercepting bar fixed in the path of the head, and parallel to the knife.

7. A feed table for fish dressing machines comprising, in combination, a plurality of upstanding lugs adapted to engage a fish, means for advancing said lugs to advance the fish bodily sidewise, a positioning pin in predetermined relationship relative to said lugs, means for advancing the pin simultaneously with the lugs, and means for adjusting the angular relationship, transversely of the table, of the lugs relative to the pin.

8. A feed table for fish dressing machines comprising, in combination, a plurality of upstanding lugs adapted to engage a fish, means for advancing said lugs to advance the fish bodily sidewise, a positioning pin in predetermined relationship relative to said lugs, means for advancing the pin simultaneously with the lugs, a knife positioned in the path of advance of the fish, and means to adjust the pin transversely of the path of its advance to vary the point of engagement of the knife with the fish.

9. A feed table for fish dressing machines comprising, in combination, two spaced shafts, pairs of complemental sprocket wheels, one of each pair loose upon one of said shafts, and the other formed in two parts, one part of which is fixed upon the other shaft, and the other part of which is loose thereupon, means for angularly adjusting the loose part relative to the fixed part, chains extending between the paired sprocket wheels, lugs upstanding from said chains, and adjustable in position relatively to lugs on adjoining chains by the specified adjustment of the sprocket wheel parts, and means for driving said second shaft.

10. The combination of claim 9, a third shaft intermediate the two first-named shafts, a sprocket wheel thereon and a complemental sprocket wheel on the first shaft, a chain extending between said latter sprocket wheels, means for driving the chain through the sprocket on the first shaft, and positioning pins on said latter chain.

11. A feed table for fish dressing machines comprising, in combination, a supporting table, a plurality of parallel feed chains movable therealong, a positioning chain parallel to the feed chains, means for advancing all of said chains at a like rate of speed, a guide for the upper run of the positioning chain, and supported on said table, and means permitting adjustment of said guide transversely of the direction of advance of the chains.

12. A feed table for fish dressing machines comprising, in combination, a supporting table, a plurality of feed chains movable therealong, a drive shaft and drive sprocket wheels thereon receiving said chains, and having their peripheries above the level of the table, and shoes engaging the upper side of said chains adjacent the sprocket wheels to hold the chains down to the table level.

13. A feed table for fish dressing machines comprising, in combination, a supporting table, a plurality of feed chains movable therealong, a drive shaft and drive sprocket wheels thereon receiving said chains, and having their peripheries above the level of the table, shoes engaging said chains adjacent the sprocket wheels to hold the chains down to the table level, and elevating means operating in advance of said shoes to lift the fish from said chains before the fish reaches said shoes.

14. A feed table for fish dressing machines comprising, in combination, a supporting table, a plurality of feed chains movable therealong, a drive shaft and drive sprocket wheels thereon receiving said chains, and having their peripheries above the level of the table, shoes engaging said chains adjacent the sprocket wheels to hold the chains down to the table level, ramps inclined upwardly and rearwardly from said shoes, and elevating arms upon and rotatable with said shaft to lift the fish from said chains and over the ramps.

15. The combination of claim 11, and a finger depending above the positioning chain, to assist in positioning fish therein.

16. A feed table as in claim 13, the elevating means comprising arms secured upon the drive shaft, and of greater length than the radius of the drive sprocket wheels thereon.

Signed at Seattle, King county, Washington, this 28 day of February, 1930.

EDWARD H. WAUGH.